United States Patent [19]

Fernschild et al.

[11] 3,894,082

[45] July 8, 1975

[54] PROCESS OF MAKING TRIFLUOROACETIC ACID

[75] Inventors: Günter Fernschild, Ahlem; Heinrich Paucksch; Joachim Massonne, both of Hannover, all of Germany

[73] Assignee: Kali-Chemie Aktiengesellschaft, Hannover, Germany

[22] Filed: Jan. 5, 1973

[21] Appl. No.: 321,521

[30] Foreign Application Priority Data

Jan. 7, 1972  Germany............................ 2200725

[52] U.S. Cl............................. 260/539 A; 260/539
[51] Int. Cl.²......................................... C07C 51/04
[58] Field of Search................................ 260/539 A

[56] References Cited
UNITED STATES PATENTS 3,288,850  11/1966  Nychka et al................... 260/539 A

*Primary Examiner*—Vivian Garner
*Attorney, Agent, or Firm*—Michael S. Striker

[57] ABSTRACT

Substantially anhydrous and chlorine-free trifluoroacetic acid is made in a continuous process by hydrolysis of trifluoroacetyl chloride with water and distillation in a manner wherein the distillation is carried out in a distillation column and attached reflux condenser and gaseous trifluoroacetyl chloride is introduced in the still of the apparatus into a boiling mixture of trifluoroacetic acid, water and hydrogen chloride which mixture has a boiling point between the boiling point of the azeotropic mixture and 72°C/760 Torr. The major portion of the trifluoroacetic acid which condenses at the head of the column is continuously withdrawn from the rising gas mixture at a place ahead of the condenser while the gas mixture which passes through the condenser and includes hydrogen chloride and residual acid is passed into an aqueous solution where it is absorbed while simultaneously an amount of water is added to the still as is necessary for the hydrolysis.

6 Claims, 4 Drawing Figures

PROCESS OF MAKING TRIFLUOROACETIC ACID

BACKGROUND OF THE INVENTION

The invention relates to a process for making substantially anhydrous and chlorine-free trifluoroacetic acid.

Trifluoroacetic acid can be made by reacting trifluoroacetyl chloride with water according to the equation:

$$CF_3COCl + H_2O \rightarrow CF_3COOH + HCl$$

Trifluoroacetyl chloride is a ready available starting product. It can for instance be formed by reacting $CF_3CHCl_2$ chlorine and oxygen (see Journal of the Chemical Society, 1959, page 387) or it can be formed from $CF_3CCl_3$ by reaction with $SO_3$ in the presence of Hg salts as catalyst (see U.S. Pat. No. 3,160,659 and German published application 1,917,630.

The processes heretofore known for making anhydrous trifluoroacetic acid however were not satisfactory. In the course of the hydrolysis aqueous solutions of trifluoroacetic acid are obtained in which the water contents of the acid varies over a broad range. Anhydrous trifluoroacetic acid can be distilled off from these solutions only if the contents of trifluroacetic acid is in excess of 85%. From more dilute solutions only a trifluoroacetic acid-water azeotrope can be distilled off which has a boiling point between about 105° and 106°C and which contains 79.4% by weight of trifluoroacetic acid and 20.6% by weight water.

Upon introduction of trifluoroacetyl chloride into water only a dilute aqueous solution of trifluoroacetic acid is obtained. Pure trifluoroacetic acid can be recovered from this mass only in a rather complex operation. For instance according to German published application Pat. No. 1,568,930 trifluoroacetic acid can be extracted by repeated shaking of the dilute acid solution with ketones of low water solubility and the organic phase can then be shaken out with a concentrated alkaline solution. The thus obtained alkaline solution is then neutralized, concentrated by evaporation and the dry residue is extracted with alcohol. After concentration by evaporation of the alcoholic extract the salt of the trifluoroacetic acid is obtained from which pure trifluoroacetic acid can be recovered with concentrated sulfuric acid.

It has also been proposed to hydrolyse trifluoroacetyl chloride in water containing sulfuric acid at temperatures below 50°C. The water contents of the sulfuric acid in this process must be at least 25% since with a lower water contents no hydrolysis takes place. Upon distillation of this hydrolysis mixture it is possible to obtain only the trifluoroacetic acid-water azeotrope and accordingly anhydrous trifluoroacetic acid cannot directly be obtained by this process.

German published application U.S. Pat. No. 1,229,062 discloses that a hydrolysis mixture can be formed from which trifluoroacetic acid can be directly obtained by distillation. However, this process also has various shortcomings. Gasified trifluoroacetyl chloride is introduced in this process into a mixture of trifluoroacetic acid and water which initially contains at least 10 and preferably at least 50% by weight of water at a temperature between 20° and 60°C. This is continued until the mixture contains 85 to 95% by weight of trifluoroacetic acid. After completion of the addition of acid chloride heating is applied under reflux to the hydrolysis solution until the dissolved hydrogen chloride is driven off. With this mixture it is possible subsequently to obtain trifluoroacetic acid as head product which is anhydrous at 72°C/760 Torr as long as the trifluoroacetic acid contents in the distillation residue does not decrease to about 82% by weight of trifluoroacetic acid.

The recovery of anhydrous trifluoroacetic acid by this process accordingly requires three successive steps. A continuous operation is therefore only possible via three process steps. Besides the hydrolysis speed in the first step decreases with decreasing water concentration. Thus the amount of trifluoroacetyl chloride which is introduced per unit of time must be decreased in the course of the operation if substantial losses of material are to be avoided. In addition the escaping hydrogen chloride must be cooled to a very low temperature in order to keep the loss of trifluoroacetic acid at a low level. Even at 0°C the gas current still contains about 6% by volume of trifluoroacetic acid.

SUMMARY OF THE INVENTION

In the invention the distillation is carried out in a continuous process in a distillation apparatus provided with a distillation column and an attached reflux condenser. Gaseous trifluoroacetyl chloride is introduced in the still of the apparatus into a boiling mixture of trifluoroacetic acid, water and hydrogen chloride. The boiling point of this mixture is between the boiling point of the azeotropic mixture and 72°C/760 Torr. The major portion of the trifluoroacetic acid which condenses at the head of the column is continuously withdrawn from the rising gas mixture at a place ahead of the condenser and the gas mixture passing through the condenser which contains hydrogen chloride and residual trifluoroacetic acid is absorbed in an aqueous solution while simultaneously an amount of water is added to the hydrolysis mixture such as is necessary to effect the hydrolysis in the still.

DETAILS OF THE INVENTION AND PREFERRED EMBODIMENTS

The process of the invention permits obtaining directly anhydrous trifluoroacetic acid by carrying out the hydrolysis of the trifluoroacetyl chloride under reaction conditions wherein the composition and boiling point of the reaction mass is such that no azeotropic acid-water mixture is formed and that only a mixture of the formed trifluoroacetic acid and hydrogen chloride is distilled off from which the trifluoroacetic acid can be obtained by condensation.

The hydrolysis can be initiated with pure water or aqueous hydrochloric acid. Upon introduction of gaseous trifluoroacetyl chloride into boiling water a rapid rise of the concentration of the trifluoroacetic acid occurs. With increasing concentration of the acid in the mixture the boiling temperature of the mixture changes and thus also the vapor composition.

Figure 2A:
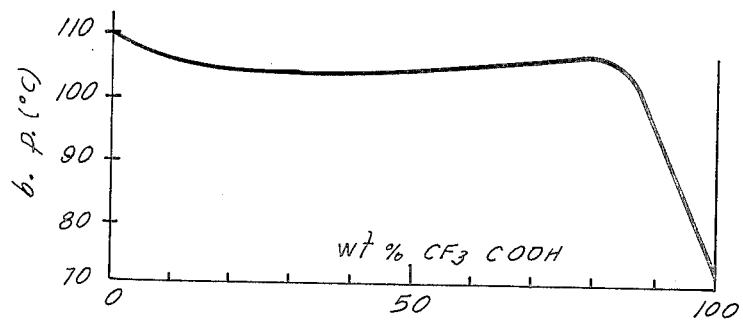
FIG. 2a graphically illustrates the relationship of concentration of trifluoroacetic acid to the boiling point of the reaction mixture.

As appears from FIG. 2a the boiling temperature at first rises to 110°C, the boiling point of the azeotropic $HCl/H_2O$ mixture, and then decreases to 106.5°C/760 Torr with increasing concentration of trifluoroacetic acid. This is the boiling point of the azeotropic $CF_3COOH/H_2O/HCl$ mixture. As soon as the concentration of trifluoroacetic acid in the mixture has reached about 82% by weight the boiling temperature again decreases. The terminal point of this curve is the boiling point of the pure trifluoroacetic acid.

Figure 2B:
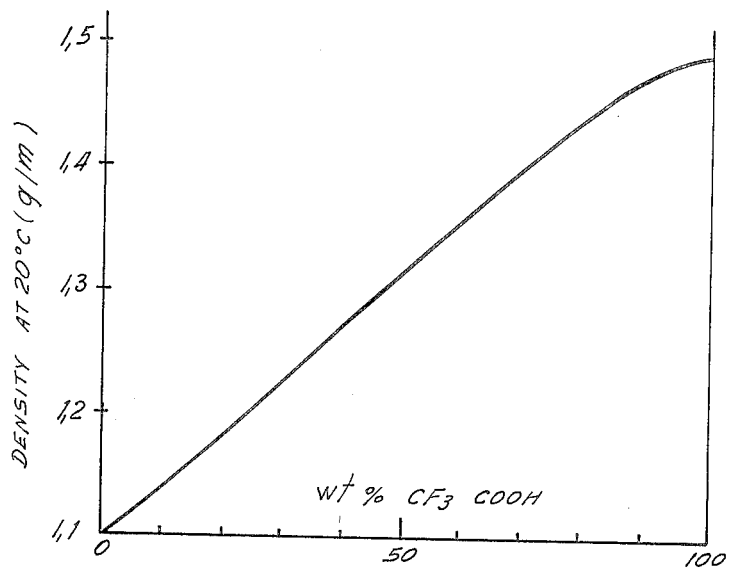
FIG. 2b in the same way illustrates the relation of the concentration of the acid to the density of the reaction mixture in g/ml at 20°C.

FIG. 2b illustrates the densities of the different mixtures in g/ml relative to a temperature of 20°C.

Figure 2C:
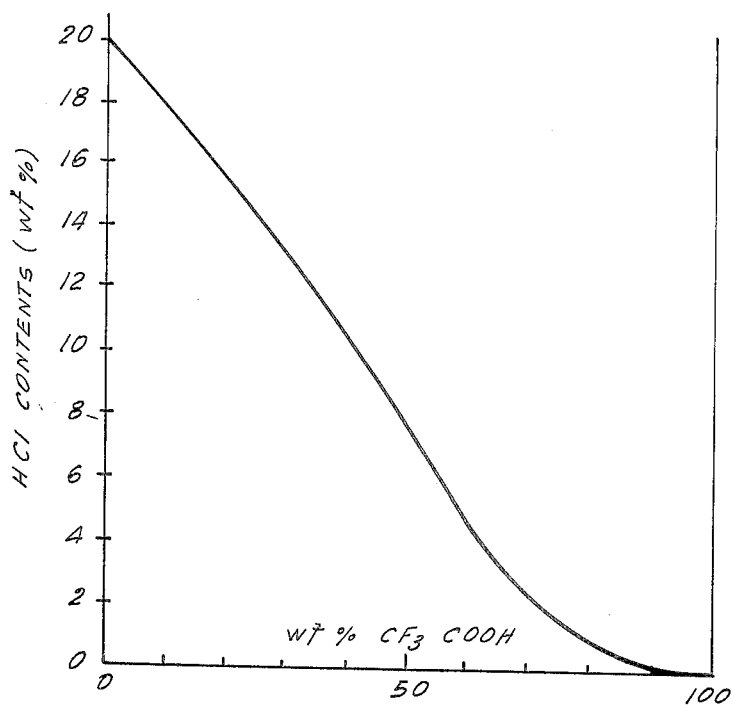
FIG. 2c illustrates the relationship of the concentration of the acid to the contents of HCl (in weight percent). In all of the drawings 2a, 2b and 2c the amount of trifluoroacetic acid is expressed in percent by weight.

FIG. 2c illustrates the HCl contents of the different reaction mixtures expressed in weight percent and determined at the boiling point.

In the beginning of the reaction the temperature of the vapor below the condenser corresponds about to the boiling temperature of the mixture, that is the composition of the vapor corresponds to that of the reaction mixture. However, as soon as the boiling temperature of the mixture decreases below 106.5°C/760 Torr a vapor temperature of 72°C/760 Torr occurs below the condenser. This means that in the distillation column a separation of the mixture takes place and that at the head of the column trifluoroacetic acid which has condensed by cooling can be withdrawn.

The entire arrangement is accordingly in an equilibrium when the vapor temperature at the head of the distillation column has descreased to 72°C. Trifluoroacetic acid can be withdrawn from the apparatus continuously as long as the amount of water which is necessary for the hydrolysis is replaced together with the employed trifluoroacetyl chloride.

The addition of water can be effected in a continuous manner or by batches. In the latter case it is however important that the formation of an azeotropically distillating mixture is avoided.

As appears from the above discussion there is a connection between the boiling temperature and the composition of the mixture. This shows that the composition can be determined by measuring the boiling temperature.

In further consequence of the process of the invention the composition of the mixture can be maintained without change if the boiling temperature during the operation is maintained constant. The mass balance and the reaction yield can be easily ascertained by basing the calculation on an operation which is in equilibrium and where, after completion of the operation, the equilibrium must again be restored.

The trifluoroacetic acid which is obtained by the process of the invention surprisingly contains only about 0.03% by weight of hydrogen chloride and has a purity in excess of 99.9% in spite of the fact that it is condensed in the presence of pure hydrogen chloride. The total yield of trifluoroacetic acid is practically 100% relative to the amount of the trifluroacetyl chloride used as starting product.

The hydrogen chloride which is formed as byproduct can be discharged through the condenser. Preferably an upright condenser is used for this purpose. The hydrogen chloride then will contain an amount of trifluoroacetic acid which corresponds to the vapor pressure of the discharge temperature. The gas mixture can be absorbed completely in water.

Surprisingly it has been found that the gas mixture which is withdrawn via the condenser can be separated by passing it through an absorber which is charged with saturated hydrochloric acid. Only the trifluoroacetic acid is absorbed in the saturated hydrochloric acid. The hydrogen chloride which is discharged from the absorber can then be absorbed in a subsequent washing device which is charged with water.

It is thus possible to obtain pure hydrochloric acid of any desired concentration by a corresponding adjustment of the amounts of water which are introduced into the second absorber. In addition it is possible to use the aqueous $HCl/CF_3COOH$ solution from the first absorber as the source of water supply for the hydrolysis of the trifluoroacetyl chloride in the mixture. For this purpose it is only necessary to feed fresh water into the first absorber in the amounts necessary for the hydrolysis and then to pass the $H_2O/HCl/$trifluoroacetic acid mixture directly into the main reaction vessel. By means of this preferred manner of operation it is possible to avoid loss of trifluoroacetic acid.

During the absorption of trifluoroacetic acid and hydrogen chloride an increase in temperature of the contents of the washing vessels occurs. The degree of this temperature increase largely depends on the particular type of operation. In the first washing device an increased temperature is advantageous because of the lowered solubility of hydrogen chloride. It is however not indispensible. In case of the absorption of the hydrogen chloride a discharge of the reaction heat by cooling is necessary to permit complete absorption of the gas.

The hydrolysis is preferably carried out at atmospheric pressure. It is however also possible to operate at a higher or lower pressure. When carrying out the process at a pressure other than atmospheric it must be taken into consideration that in that case the boiling points and possibly also the composition of the mixtures will be affected.

Figure 1:
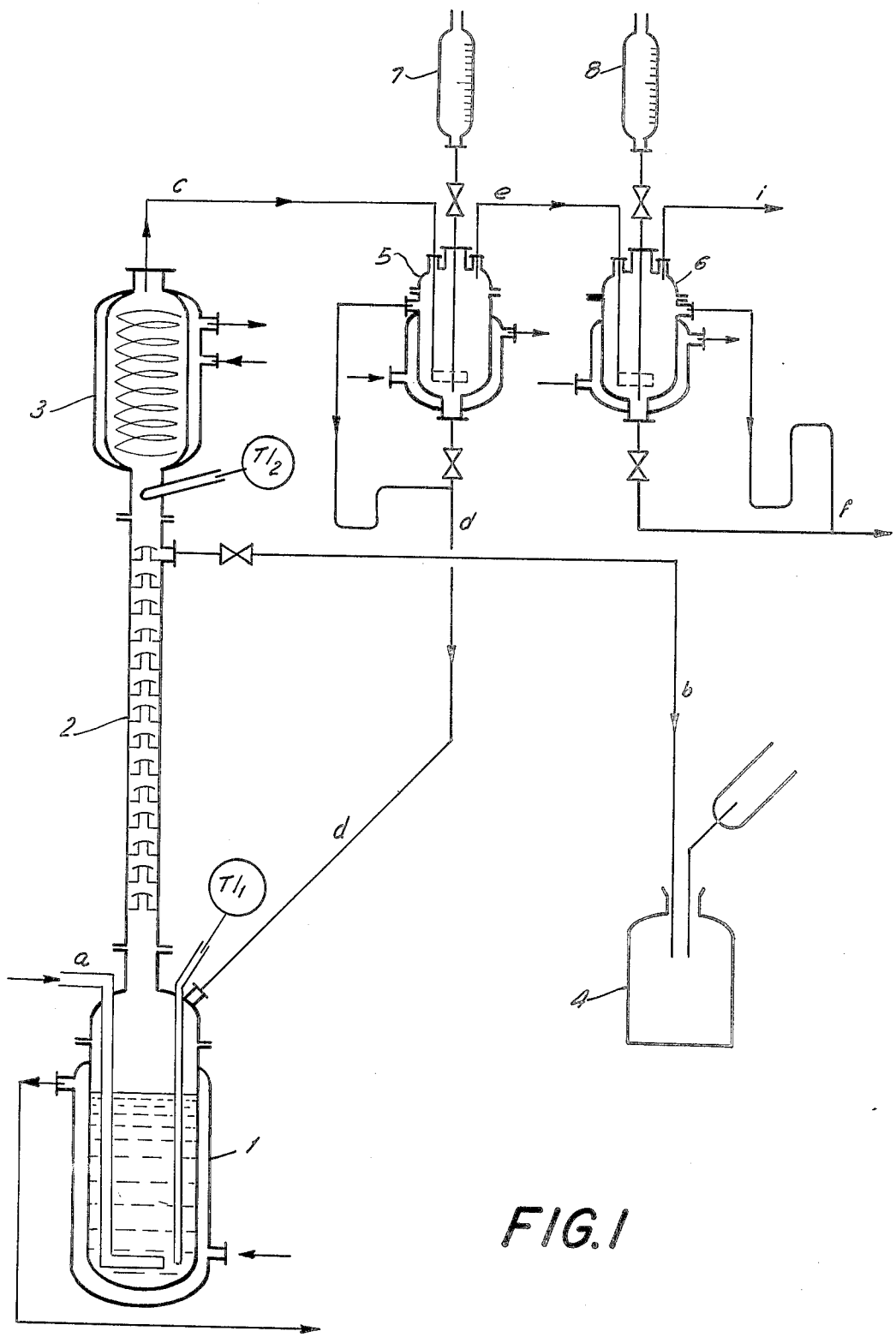
FIG. 1, in diagrammatical manner, illustrates an apparatus for carrying out the process of the invention.

The apparatus used in the invention is schematically illustrated in FIG. 1. In the arrangement which is at equilibrium trifluoroacetyl chloride is introduced through the duct a into the reaction vessel 1. From the absorber or wash bottle 5 an $H_2O/HCl/CF_3COOH$ mixture is at the same time introduced into the reaction vessel (the still of the distillation apparatus) through the duct d in an amount to provide for the necessary amount of water for the hydrolysis.

In the distillation column 2 which connects with the still and which is provided with a reflux condenser 3 the trifluoroacetic acid and hydrogen chloride are separated from the boiling mixture by rectification. The trifluoroacetic acid is condensed from the mixture by the cooling device and can be withdrawn through the outlet b from the top plate of the column 2 and passed into a collector 4.

The reflux cooler 3 can be operated with cooling water of a temperature between 10° and 25°C or also with a cooling liquid at a lower temperature. Which amount of trifluoroacetic acid is still present in the discharge of hydrogen chloride depends on the efficiency of the condenser. The gas mixture which is withdrawn via the condenser is then passed into an absorber or washing vessel 5 through duct c. In this absorber which is charged with saturated hydrochloric acid the absorption takes place of the trifluoroacetic acid still present. The stream of gas discharged from this absorber then passes through the duct *e* into the absorber 6 which is charged with dilute hydrochloric acid. In this absorber 5 the absorption of the hydrogen chloride takes place. The inert gases which are present in the gas mixture are discharged from the absorber via the duct *i*.

The absorbers 5 and 6 are supplied with fresh water from the supply vessels 7 and 8. By means of an overflow it is possible to maintain a constant liquid level in the two absorbers. The wash liquids are continuously withdrawn via the ducts *d* and *f*. The $HCl/H_2O/CF_3COOH$ mixture is discharged via the duct *d* into the reactor 1 while the hydrochloric acid is discharged via the duct *f* into a receiving vessel provided for this purpose. The addition of water from the vessel 7 via the duct *g* must be adjusted to provide for the proper amount of water necessary for the hydrolysis in the solution withdrawn from the absorber 5. The amount of water passed into absorber 6 from the supply vessel 8 via the duct *h* must be adjusted to assure absorption of the entire hydrogen chloride.

As already indicated there is a connection between the boiling temperature in the principal reactor 1 and the composition of the mixture. For this reason the composition of the mixture can be determined by measuring the boiling temperature By measuring the temperature in reaction vessel 1 it is therefore possible to control the course of the hydrolysis.

In the following examples which illustrate the invention it is therefore sufficient to state the particular boiling temperature to show the course of the reaction.

The apparatus employed in the following examples is substantially that described above and shown in FIG. 1 of the drawings. However in Examples 1 to 3 a short inlet stub was used for the reaction liquid instead of the duct *d*.

The following examples will further illustrate the invention.

EXAMPLE 1

A reaction vessel was used in this example consisting of glass. The vessel was provided with a distillation column and a condenser and furthermore with an inlet duct for a gaseous feed product and a separate inlet for a liquid feed. The reaction vessel was filled with 800 ml of aqueous trifluoroacetic acid which contained about 80% of trifluoroacetic acid. The reflux condenser was operated with a cooling liquid having a temperature of about 5°C. After heating the mixture to the boiling point of 105°C gaseous trifluoroacetyl chloride was introduced at a flow speed of 1.56 mole/hr. (206.5 g/hr).

After about 10 minutes equilibrium was reached in the column.

The temperature measured at TI2 was 72°C. Through the head of the condenser a constant stream of gas was discharged which was absorbed in a wash bottle arranged in series with the condenser. Through the duct *b* pure trifluoroacetic acid was withdrawn which contained less than 0.03% by weight of hydrogen chloride.

After 1 hour the introduction of trifluoroacetyl chloride was discontinued. During the introduction the temperature had first decreased in the mass to 102°C but it rose again by further decrease of trifluoroacetic acid in the mixture to a temperature of 105°C after completion of the operation.

The same arrangement at equilibrium was used also in the following examples 2 and 3 in which also the same apparatus was employed as described.

EXAMPLES 2 and 3

Prior to commencement of each operation the arrangement was at equilibrium without trifluoroacetyl chloride and water introduction and also without withdrawal of trifluoroacetic acid and hydrogen chloride.

Table 1 in column 2 shows the reaction time and in columns 3 to 6 shows the initial reaction mixture. After completion of the operation in each case the initial condition was restored.

Columns 7 and 8 show the amounts of trifluoroacetyl chloride and water which were introduced during the operation. The addition of water was effected in about ⅔ of the entire reaction time while the addition of trifluoroacetyl chloride remained constant throughout this period.

Columns 9 to 12 show the amounts of trifluoroacetic acid and hydrogen chloride which were obtained up to restoration of the initial reaction condition in the reaction vessel. Column 13 shows the yield of trifluoroacetic acid and hydrogen chloride relative to the feed of trifluoroacetyl chloride. The mole ratio of hydrogen chloride to trifluoroacetic acid in the wash bottles 5 and 6 was about the same in both operations. This indicates that the trifluoroacetic acid which is entrained in the hydrogen chloride does not derive from the trifluoroacetyl chloride which might have passed through the apparatus without hydrolysis. The trifluoroacetic acid partial pressures in the gas mixture of 72 Torr and 71 Torr correspond o an initial condenser temperature of about to C. The temperature of the cooling liquid was 0° to 5°C.

As the examples show there was obtained an almost 100% yield of trifluoroacetic acid relative to the initial amount of trifluoroacetyl chloride.

TABLE 1

| Ex. | Reaction Time (h) | TI 1 (°C) | | Initial amounts in 820 ml still | | $CF_3COCl+H_2O$ fed into still 1 | | Yield in receiver 4 | | Received in Absorbing Vessels 5 and 6 | | Total Yield (%) |
|---|---|---|---|---|---|---|---|---|---|---|---|---|
| | | | | (wt.%) | (g) | (g) | (mole) | (g) | (mole) | (g) | (mole) | |
| 2 | 2.5 | 97 | $CF_3COOH$ | 91.0 | 1096 | — | — | 868 | 7.62 | 101.5 | 0.89 | 100* |
| | | | HCl | 0.15 | 1.8 | — | — | — | — | 310.5 | 8.52 | 100* |
| | | | $H_2O$ | 8.85 | 106.6 | 153 | 8.50 | — | — | — | — | — |
| | | | $CF_3COCl$ | — | — | 1125 | 8.50 | — | — | — | — | — |
| 3 | 1.33 | 82 | $CF_3COOH$ | 97.0 | 1182 | — | — | 299 | 2.62 | 34.2 | 0.30 | 99.7 |
| | | | HCl | 0.03 | 0.37 | — | — | — | — | 106.0 | 2.91 | 99.3 |
| | | | $H_2O$ | 2.97 | 36.2 | 52.75 | 2.93 | — | — | — | — | — |
| | | | $CF_3COCl$ | — | — | 388 | 2.93 | — | — | — | — | — | approximately*

EXAMPLE 4

The same apparatus was used in this example as shown in FIG. 1. In the reaction vessel 1,800 ml of a mixture having a boiling point of 102°C was placed of the following composition.

|  | wt. % | g/800 ml |
|---|---|---|
| CF$_3$COOH | 88.0 | 1033 |
| H$_2$O | 11.77 | 137.2 |
| HCl | 0.23 | 2.7 |

3.05 mole (404 g) of CF$_3$COCl/hr were introduced continuously through the gas inlet duct *a*. Simultaneously 3.05 mole (348 g) of CF$_3$COOH/hr were withdrawn through the duct *b*.

The gas mixture which discharged through the duct *c* was then passed through the wash bottles 5 and 6 arranged one after the other. The wash bottle 5 was provided with an overflow and was filled with 100 ml water. Another 50 g of water/hr were introduced from the supply vessel 7. The temperature during the absorption of the gas mixture was maintained at 60°C.

After a brief initial time the overflow consisted of concentrated hydrochloric acid containing about 7% by weight of trifluoroacetic acid. The overflow was passed through duct *d* to the reaction vessel 1 and thus served as the water supply for the hydrolysis.

The gas mixture leaving the water bottle 5 consisted only of hydrogen chloride and inert gases. In the wash bottle 6 the hydrogen chloride was then removed. Thus about 550 g of water could be converted per hour into a 20% concentration hydrochloric acid. Within 3 hrs. 1040 g of trifluoroacetic acid and 1.8 of an about 20% hydrochloric acid were obtained. The operation took place without any incident. Volume and temperature in the reaction vessel were not changed.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An improvement in the process of making substantially anhydrous and chlorine-free trifluoroacetic acid in a continuous process by hydrolysis of trifluoroacetyl chloride with water and distillation, the said improvement comprising carrying out the distillation in a continuous process in a distillation apparatus provided with a distillation column and an attached reflux condenser by
   a. introducing in the still of the apparatus gaseous trifluoroacetyl chloride into a boiling mixture of trifluoroacetic acid, water and hydrogen chloride, the boiling point of the mixture being between the boiling point of the azeotropic mixture and 72°C/760 Torr, while
   b. withdrawing the major portion of the trifluoroacetic acid condensing at the head of the column from the rising gas mixture at a place ahead of the condenser;
   c. absorbing the gas mixture passing through the condenser, which mixture includes the hydrogen chloride formed in the reaction and residual trifluoroacetic acid, in an aqueous solution, and
   d. simultaneously introducing the amount of water necessary for the hydrolysis into the still.

2. The process of claim 1 wherein the gas mixture after passing through the condenser is led into at least one absorption vessel containing hydrochloric acid and water to effect said absorption.

3. The process of claim 2 wherein an aqueous hydrochloric acid-trifluoroacetic acid solution is recovered from said absorption vessel and is recirculated into the distillation apparatus for further hydrolysis of trifluoroacetyl chloride.

4. The process of claim 2 wherein an amount of water is added in said absorption vessel to permit recovery therefrom of a mixture of hydrogen chloride and trifluoroacetic acid which mixture contains water in the amount required for said hydrolysis and wherein said mixture is then recirculated into the distillation still for further hydrolysis of trifluoroacetyl chloride.

5. The process of claim 2 wherein the gas mixture after passing through the condenser is led through at least two absorption vessels arranged in series, the first vessel being charged with a concentrated aqueous solution of hydrochloric acid to absorb residual trifluoroacetic acid and the second vessel being charged with dilute hydrochloric acid to absorb the hydrogen chloride discharged from the first absorption vessel.

6. The process of claim 5 wherein an amount of water is added in said second absorption vessel to assure absorption of the entire hydrogen chloride.

* * * * *